(12) United States Patent
Nishiyama

(10) Patent No.: US 8,705,094 B2
(45) Date of Patent: Apr. 22, 2014

(54) DEVICE MANAGEMENT SYSTEM, MANAGED DEVICE, INFORMATION PROVIDING METHOD, AND STORAGE MEDIUM

(75) Inventor: Yoko Nishiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 433 days.

(21) Appl. No.: 13/023,097

(22) Filed: Feb. 8, 2011

(65) Prior Publication Data

US 2011/0205580 A1 Aug. 25, 2011

(30) Foreign Application Priority Data

Feb. 25, 2010 (JP) ................................. 2010-040842

(51) Int. Cl.
*G06F 3/12* (2006.01)
(52) U.S. Cl.
USPC ......... 358/1.15; 358/1.13; 358/1.11; 358/1.1; 709/206; 709/207; 709/224
(58) Field of Classification Search
None
See application file for complete search history.

(56) References Cited

U.S. PATENT DOCUMENTS

| | | | | |
|---|---|---|---|---|
| 5,740,353 A * | 4/1998 | Kreulen et al. | | 714/42 |
| 6,388,757 B1 * | 5/2002 | Koga | | 358/1.11 |
| 6,646,989 B1 * | 11/2003 | Khotimsky et al. | | 370/238 |
| 6,693,722 B1 * | 2/2004 | Mixer, Jr. | | 358/1.15 |
| 7,007,083 B1 * | 2/2006 | Chesley | | 709/224 |
| 7,163,273 B2 * | 1/2007 | Silverbrook | | 347/19 |
| 7,469,256 B1 * | 12/2008 | Manolov et al. | | 1/1 |
| 7,508,535 B2 * | 3/2009 | Hart et al. | | 358/1.15 |
| 7,561,286 B2 * | 7/2009 | Suto | | 358/1.14 |
| 7,624,182 B2 * | 11/2009 | Ding | | 709/226 |
| 8,037,196 B2 * | 10/2011 | Chiu | | 709/230 |
| 2002/0114611 A1 * | 8/2002 | Gu et al. | | 386/46 |

FOREIGN PATENT DOCUMENTS

| | | |
|---|---|---|
| JP | 10-198623 | 7/1998 |
| JP | 2006-338417 | 12/2006 |
| JP | 2008-197828 | 8/2008 |

OTHER PUBLICATIONS

Japanese Office Action dated Sep. 17, 2013.

* cited by examiner

*Primary Examiner* — Ashish K Thomas
(74) *Attorney, Agent, or Firm* — IPUSA, PLLC

(57) ABSTRACT

A device management system includes a managed device and a device management apparatus. The device management apparatus includes an information acquisition unit requesting device information from the managed device. The managed device includes a storage unit, a first information source managing device information that is available via a communication protocol, a second information source managing device information that is not available via the communication protocol, and an information providing unit providing the requested device information to the information acquisition unit. The information providing unit determines whether an up-to-date version of the requested device information is stored in a storage area of the storage unit and obtains the up-to-date version of the requested device information from the first information source or the second information source if the up-to-date version of the requested device information is not stored in the storage area of the storage unit.

8 Claims, 13 Drawing Sheets

MaxCopyCounterPerMonth =20000
PowerConsumption. fullPower =704
PowerConsumption. lowPower =222
PowerConsumption. standby =1.5
PowerConsumption. other =99
PaperSizeSupported =iso-a4, jis-b4, iso-a5
. . . .

FIG.6B

| SERIAL NO. | MAXIMUM NUMBER OF COPIES PER MONTH | SUPPORTED PAPER SIZES | WORD LENGTHS INDICATING POWER CONSUMPTION LEVELS | | | |
|---|---|---|---|---|---|---|
| | | | FULL POWER MODE | LOW POWER MODE | STANDBY MODE | INTERMEDIATE MODE |
| 445337 | 20000 | iso-a4, jis-b4, iso-a5 | 704 | 222 | 1.5 | 99 |
| 223410 | 15000 | iso-a3, iso-a4, iso-a5 | 608 | 198 | 1.0 | 78 |
| ..... | ..... | ..... | ..... | ..... | ..... | ..... |

| UPDATED DATE AND TIME | INFORMATION ITEM NAME | VALUE | INFORMATION SOURCE (INFORMATION MANAGEMENT UNIT) | |
|---|---|---|---|---|
| 2009/11/05 17:53 | POWER CONSUMPTION (WORD LENGTH) IN FULL POWER MODE | 704 | EXTENDED INFORMATION MANAGEMENT UNIT | ... |
| 2009/10/01 12:32 | SUPPORTED PAPER SIZES | iso-a4, jis-b4, iso-a5 | SNMP INFORMATION MANAGEMENT UNIT | ... |
| 2009/11/05 09:14 | MAXIMUM NUMBER OF COPIES PER MONTH OF CONNECTED DEVICE XX | 20000 | EXTENDED INFORMATION MANAGEMENT UNIT | ... |
| ... | ... | ... | SOAP INFORMATION MANAGEMENT UNIT | ... |
| ... | ... | ... | ... | ... |

233D

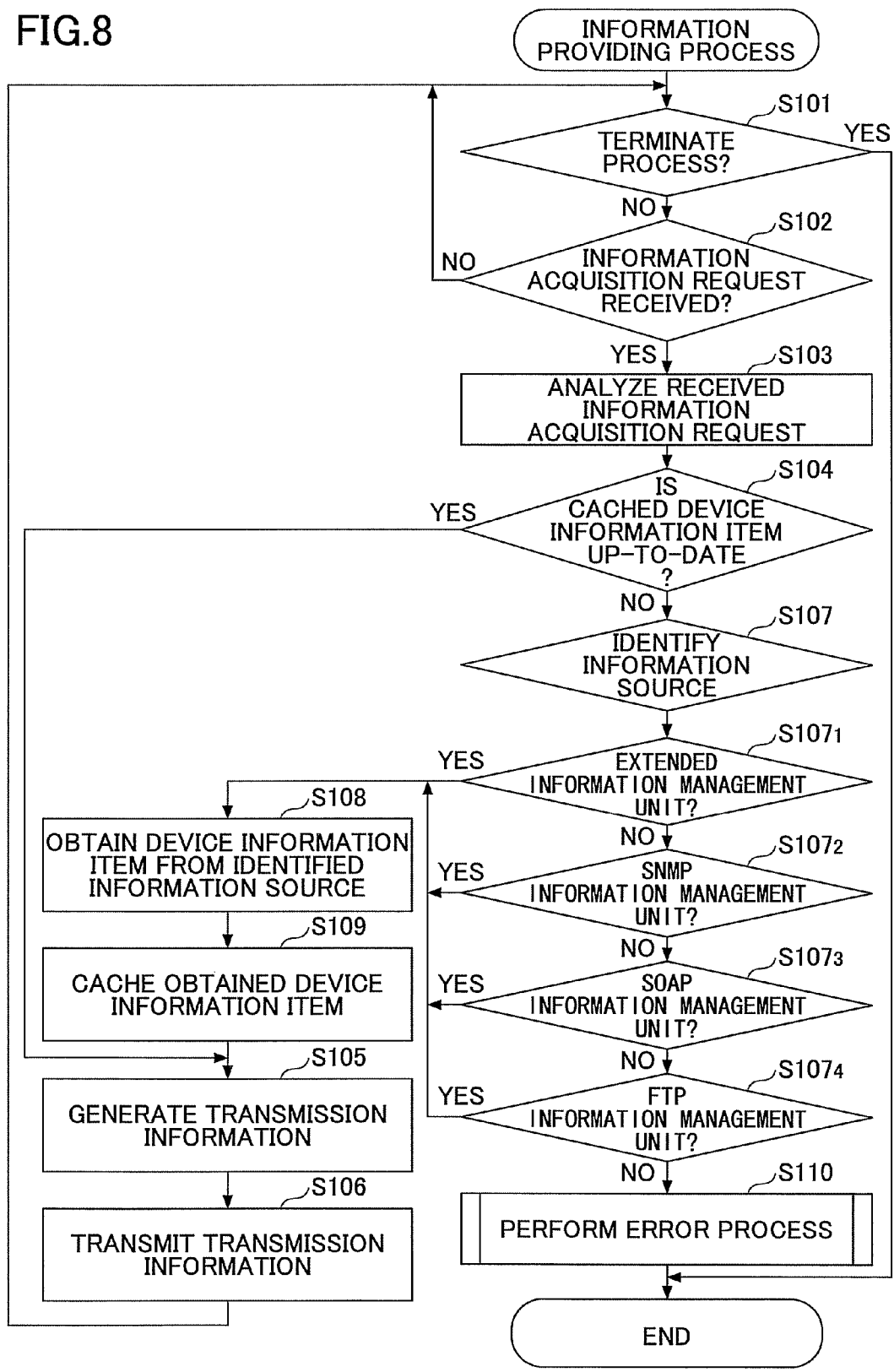

DEVICE MANAGEMENT SYSTEM, MANAGED DEVICE, INFORMATION PROVIDING METHOD, AND STORAGE MEDIUM

BACKGROUND OF THE INVENTION

1. Field of the Invention

A certain aspect of this disclosure relates to a device management system including a device management apparatus and a managed device.

2. Description of the Related Art

There is a known device management system including an image processing device (hereafter called a managed device) such as a multifunction peripheral (MFP) or a printer and a device management apparatus (device management server) for monitoring the status of the managed device via a data communication channel such as a network. Such a device management system enables a user to detect an error or failure of a managed device without going to the location where the managed device is installed.

In a typical device management system, a device management apparatus provides a device management service (device management function) through a process as described below. For example, the device management apparatus periodically obtains device information from a managed device using communication protocols such as simple network management protocol (SNMP) and simple object access protocol (SOAP). The obtained device information is stored in a storage unit of the device management apparatus. The device management apparatus detects a status change of the managed device based on the stored device information, and reports the status change to an administrator and/or performs a remote control on the managed device according to a predetermined device management policy.

Apparently, to improve the device management service of the device management system (e.g., for efficient use and speedy maintenance of devices), the device management apparatus is preferably configured to obtain as many types of device information as possible from the managed device.

Japanese Laid-Open Patent Publication No. 2008-197828 discloses a device management apparatus that when receiving a request for a device information item, obtains the requested device information item from a communication device based on a correspondence table associating available device information items with communication protocols and provides the obtained device information item to the requester. Thus, the disclosed device management apparatus obtains a device information item from a corresponding information source (communication protocol).

However, with the configuration disclosed in Japanese Laid-Open Patent Publication No. 2008-197828, only device information provided via existing communication protocols can be obtained.

For example, with SNMP, it is not possible to obtain the word length indicating the power consumption level in a given power supply mode of a managed device. Also with SNMP, it is not possible to obtain the serial number of an external device (or a connected device) such as a finisher connected to a multifunction peripheral.

SUMMARY OF THE INVENTION

In an aspect of this disclosure, there is provided a device management system including a managed device; and a device management apparatus connected to the managed device via a data communication channel and managing the managed device. The device management apparatus includes an information acquisition unit transmitting an information acquisition request to request device information from the managed device. The managed device includes a storage unit, a first information source managing device information that is available via a communication protocol, a second information source managing device information that is not available via the communication protocol, and an information providing unit providing the requested device information to the information acquisition unit in response to the information acquisition request. The information providing unit includes a receiving unit receiving the information acquisition request from the information acquisition unit, a determining unit determining whether an up-to-date version of the requested device information is stored in a storage area of the storage unit, an obtaining unit obtaining the up-to-date version of the requested device information from the first information source or the second information source if the determining unit determines that the up-to-date version of the requested device information is not stored in the storage area of the storage unit, and a transmitting unit transmitting the up-to-date version of the requested device information to the information acquisition unit of the device management apparatus.

BRIEF DESCRIPTION OF THE DRAWINGS

FIG. 6A is a drawing illustrating exemplary extended information;

FIG. 6B is a table showing exemplary extended information;

FIG. 7B is a table showing exemplary stored data in an information providing unit;

FIG. 8 is a flowchart showing an exemplary information providing process according to the first embodiment;

DESCRIPTION OF THE PREFERRED EMBODIMENTS

Preferred embodiments of the present invention are described below with reference to the accompanying drawings.

First Embodiment

<System Configuration>

Figure 1:
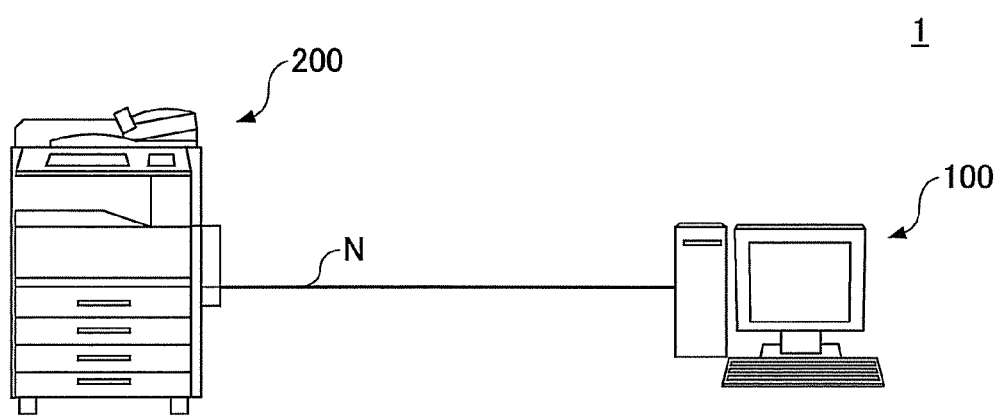
FIG. 1 is a drawing illustrating an exemplary configuration of a device management system according to a first embodiment of the present invention.

FIG. 1 is a drawing illustrating an exemplary configuration of a device management system 1 according to a first embodiment of the present invention.

As shown in FIG. 1, the device management system 1 includes a device management apparatus (device management server) 100 and at least one managed device 200 (a device to be managed by the device management apparatus 100) that are connected via a data communication channel N such as a network (e.g., local area network: LAN). Although the device management system 1 may include multiple managed devices 200, the managed device 200 is expressed in the singular form for descriptive purposes.

The managed device 200 is, for example, an image processing device such as a multifunction peripheral (MFP) or a laser printer used in an office.

The device management apparatus 100 obtains device information (e.g., unique information and status information) from the managed device 200 using communication protocols such as SNMP and SOAP and manages the managed device 200 based on the obtained device information. For example, the device management apparatus 100 monitors and maintains the managed device 200

The device management apparatus 100 receives a request for device information such as unique information or status information of the managed device 200 from, for example, a client personal computer (PC) connected to the device management system 1 and provides the device information to the client PC (or a user).

With the above configuration, the device management system 1 provides the user with a device management service (device management function).

<Hardware Configurations>

Hardware configurations of the device management apparatus 100 and the managed device 200 of this embodiment are described below.

[Device Management Apparatus]

Figure 2:
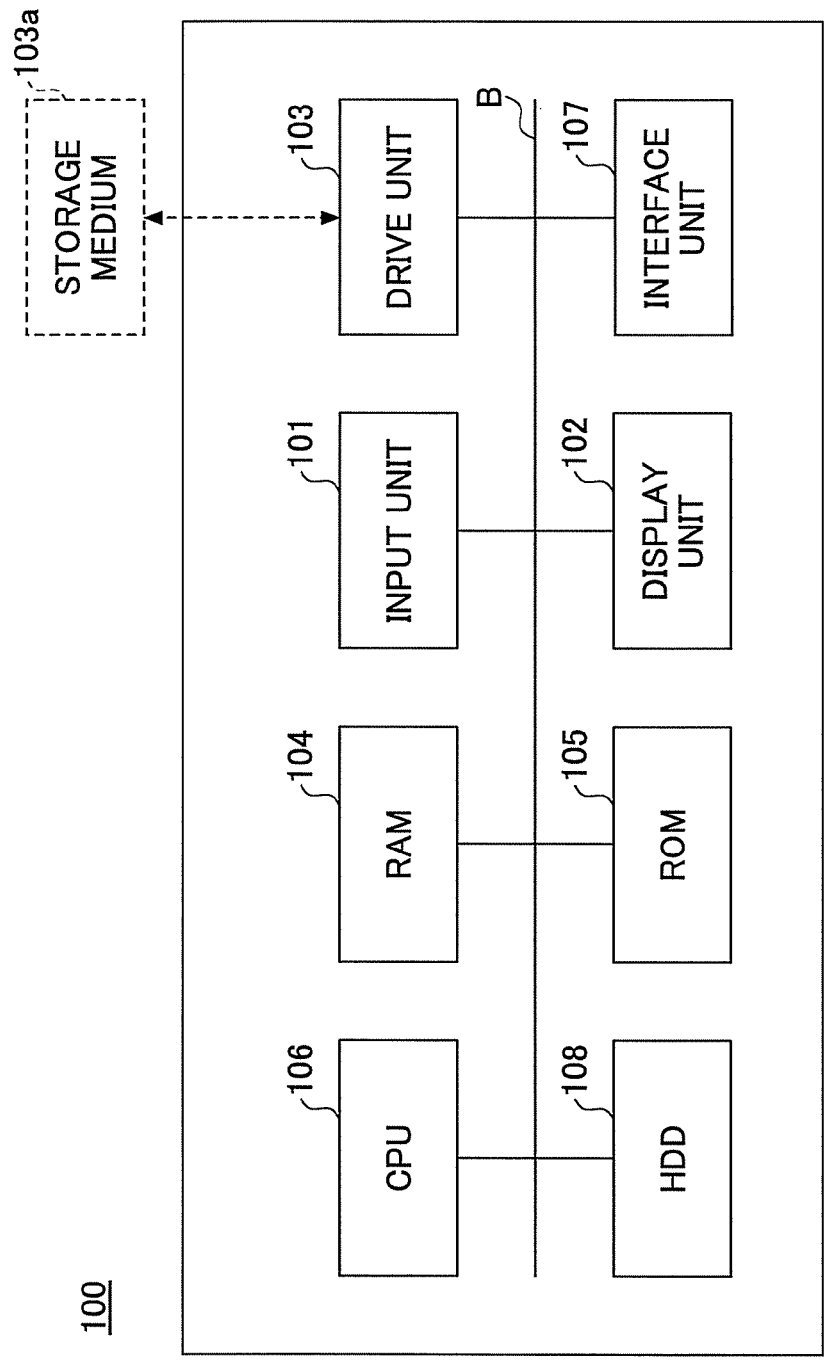
FIG. 2 is a block diagram illustrating an exemplary hardware configuration of a device management apparatus according to the first embodiment.

FIG. 2 is a block diagram illustrating an exemplary hardware configuration of the device management apparatus 100 of this embodiment.

As shown in FIG. 2, the device management apparatus 100 includes an input unit 101, a display unit 102, a drive unit 103, a random access memory (RAM) 104, a read only memory (ROM) 105, a central processing unit (CPU) 106, an interface unit 107, and a hard disk drive (HDD) 108 that are connected to each other via a bus B.

The input unit 101 includes, for example, a keyboard and a mouse, and is used by the user to input commands to the device management apparatus 100. The display unit 102 displays processing results (e.g., obtained device information) of the device management apparatus 100.

The interface unit 107 connects the device management apparatus 100 to the data communication channel N. The device management apparatus 100 can communicate with the managed device 200 and the client PC via the interface unit 107.

The HDD 108 is a non-volatile storage unit for storing various programs and data. For example, the HDD 108 stores information processing system software (e.g., an operating system such as Windows (registered trademark) or UNIX (registered trademark)) for controlling the entire device management apparatus 100, and applications that are executed on the information processing system software to provide various functions (e.g., the device management function). The HDD 108 also manages the stored programs and data in a file system or a database (DB).

The drive unit 103 is an interface between the device management apparatus 100 and a removable storage medium 103a. The device management apparatus 100 can read and write data from and to the storage medium 103a via the drive unit 103.

The ROM 105 is a non-volatile semiconductor memory (storage unit) that can retain data even when the power is turned off. For example, the ROM 105 stores the basic input/output system (BIOS) that is executed when the device management apparatus 100 is turned on and data such as system settings and network settings of the device management apparatus 100.

The RAM 104 is a volatile semiconductor memory (storage unit) that temporarily stores programs and data retrieved from other storage units. The CPU 106 loads programs into the RAM 104 and executes the loaded programs to control the device management apparatus 100.

With the above hardware configuration, the device management apparatus 100 provides an information processing service (information processing function) including the device management service.

As is apparent from the hardware configuration, the device management apparatus 100 may be implemented by a personal computer.

[Managed Device/Image Processing Device]

Figure 3:
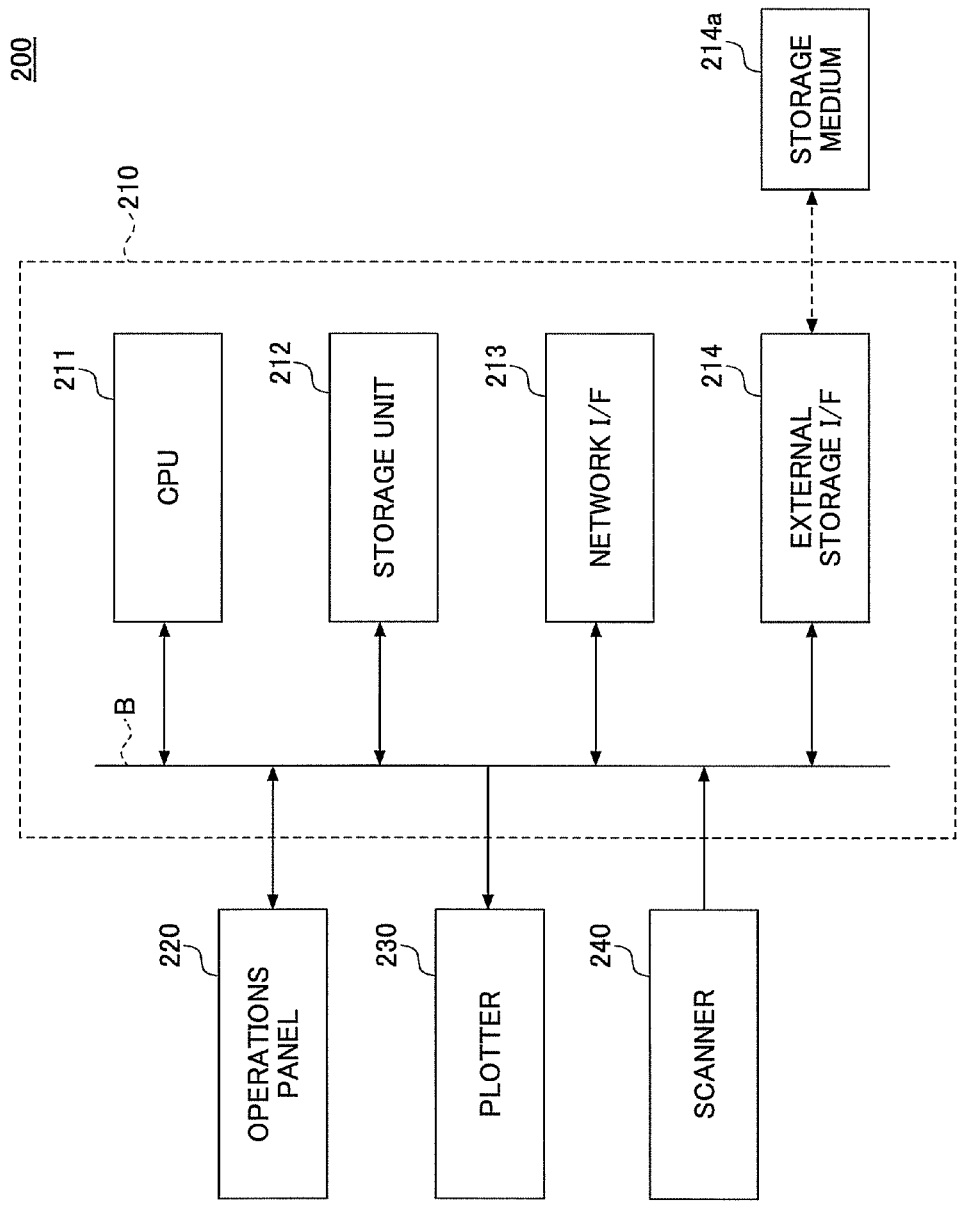
FIG. 3 is a block diagram illustrating an exemplary hardware configuration of a managed device (image processing device) according to the first embodiment.

FIG. 3 is a block diagram illustrating an exemplary hardware configuration of the managed device 200 of this embodiment. In this embodiment, the managed device 200 is implemented as an image processing device.

As illustrated in FIG. 3, the managed device (image processing device) 200 includes a controller 210, an operations panel 220, a plotter 230, and a scanner 240 that are connected to each other via a bus B.

The operations panel 220 includes a display unit for providing information such as device information to the user and an input unit for receiving user inputs such as settings and commands. The plotter 230 includes an image forming unit for forming an image on a recording medium (e.g., paper). For example, the plotter 230 forms an image by electrophotography or inkjet printing. The scanner 240 optically scans a document and generates image data.

The controller 210 includes a CPU 211, a storage unit 212, a network I/F 213, and an external storage I/F 214 that are connected via a bus B.

The CPU 211 executes programs and thereby controls the entire managed device 200. The storage unit 212 stores programs and data (e.g., image data). The storage unit 212, for example, includes a RAM as a volatile memory, a ROM as a non-volatile memory, and an HDD as a mass storage. The RAM is used as a work area (a storage area where programs and data are temporarily stored) by the CPU 211. The ROM and the HDD store programs and other data. The CPU 211 loads programs from the ROM into the RAM and executes the loaded programs.

The network I/F 213 is an interface for connecting the managed device 200 to the data communication channel N. The external storage I/F 214 is an interface for connecting a storage medium 214a used as an external storage to the managed device 200. The storage medium 214a is, for example, implemented by an SD memory card or a universal serial bus (USB) memory. The managed device 200 reads programs and data from the storage medium 214a via the external storage I/F 214.

With the above hardware configuration, the managed device 200 provides an image processing service (image processing function).

In the device management system 1 as described above, the device management apparatus 100 and the managed device 200 communicate (or collaborate) with each other to provide device information on the managed device 200.

<Information Providing Function>

An information providing function of this embodiment is described below.

In the device management system 1, the managed device 200 provides information to the device management apparatus 100 through a process as described below. When receiving an information acquisition request (request data) from the device management apparatus 100, the managed device 200 analyzes the received information acquisition request. Based on the results of analysis, the managed device 200 determines whether an up-to-date version of requested device information is cached (or stored) in a predetermined storage area of the storage unit 212. If the up-to-date version of the requested device information is not cached in the storage area, the managed device 200 obtains the up-to-date version of the requested device information from one of information management units of a communication protocol information management unit or an extended information management unit, which is an information source associated with the requested device information, and caches the obtained (up-to-date) device information in the storage unit 212. Then, the managed device 200 returns the cached device information to the device management apparatus 100.

As described above, there is a related-art method for obtaining device information via multiple communication protocols (or information sources) such as SNMP and SOAP. However, with the related-art method, only device information provided via existing communication protocols can be obtained. For example, with SNMP, it is not possible to obtain the word length indicating the power consumption level of the managed device 200. Also with SNMP, it is not possible to obtain the serial number of an external device such as a finisher connected to the managed device 200.

In the device management system 1 of this embodiment, the managed device 200 includes information sources corresponding to existing communication protocols and a separate information source for providing device information that is not available via the existing communication protocols. According to an information acquisition request from the device management apparatus 100, the managed device 200 obtains requested device information from a corresponding one of the information sources.

This configuration makes it possible to provide additional device information without extending the range of device information provided via existing communication protocols. In other words, this configuration makes it possible to obtain additional device information that is not available via existing communication protocols. Obtaining additional device information in turn makes it possible to more effectively perform device management. For example, the above configuration makes it possible to obtain the serial number of a finisher connected to the managed device 200 and thereby to determine the timing of replacing the finisher.

An exemplary functional configuration and exemplary operations of the device management system 1 are described below.

Figure 4:
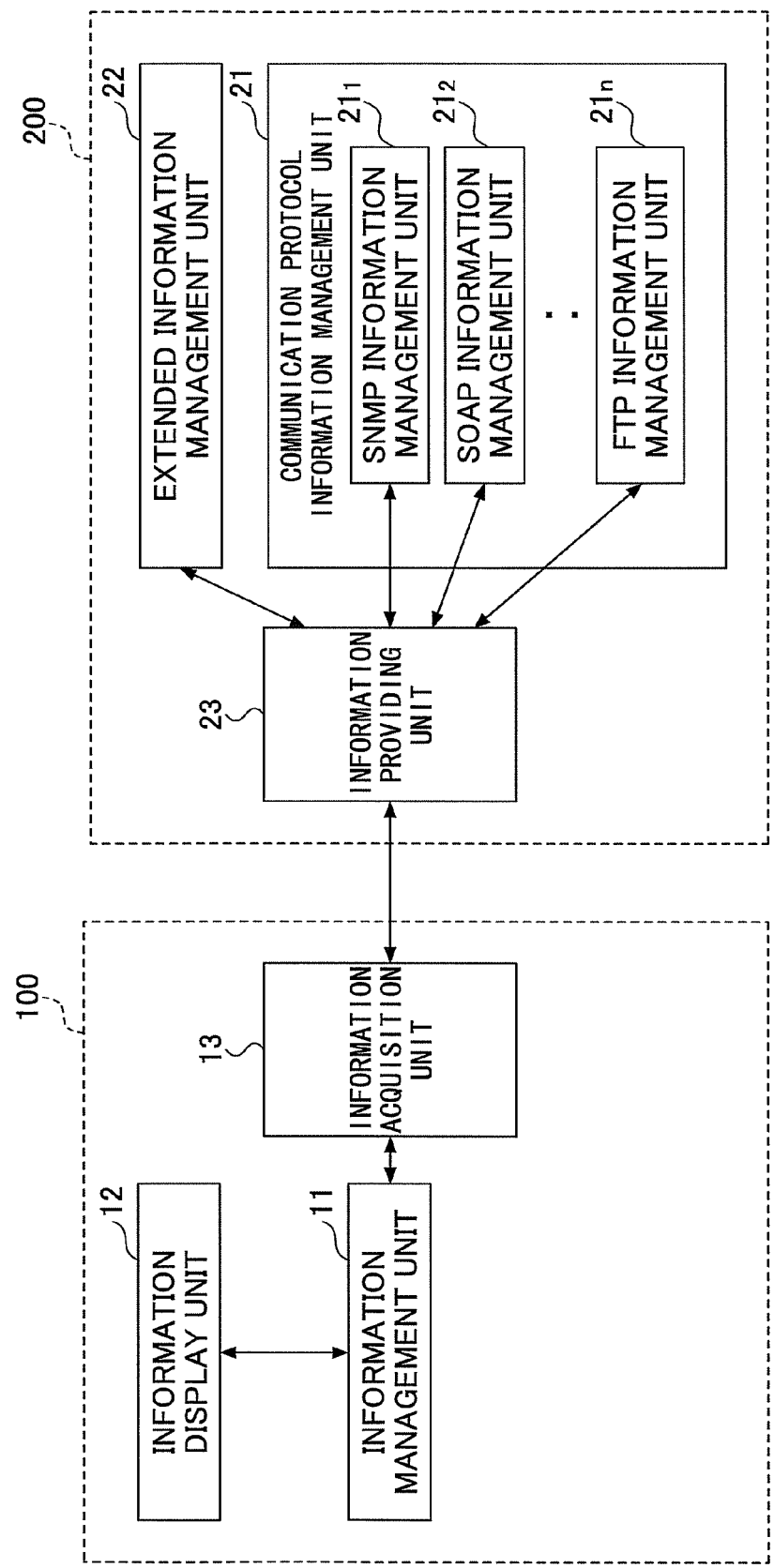
FIG. 4 is a block diagram illustrating an exemplary functional configuration of a device management system according to the first embodiment.

FIG. 4 is a drawing illustrating an exemplary functional configuration of the device management system 1 of this embodiment.

As illustrated in FIG. 4, the device management apparatus 100 includes an information management unit 11, an information display unit 12, and an information acquisition unit 13; and the managed device 200 includes a communication protocol information management unit 21, an extended information management unit 22, and an information providing unit 23. These components may be called functional units.

[Device Management Apparatus]

The information management unit 11 manages device information received from the managed device 200. For example, the information management unit 11 registers, deletes, searches, and obtains device information according to requests from the information display unit 12 and the information acquisition unit 13. When receiving an information registration request from the information acquisition unit 13, the information management unit 11 stores the device information received from the managed device 200 in a predetermined storage area of a storage unit (e.g., the HDD 108) of the device management apparatus 100 and thereby registers the device information.

When receiving an information acquisition request from the information display unit 12, the information management unit 11 searches the storage unit (or stored device information) based on an identifier (e.g., a device name or a device ID) of the managed device 200 specified in the information acquisition request to obtain requested device information, and returns the obtained device information to the information display unit 12. Thus, the device management apparatus 100 is capable of providing device information of a specified managed device 200.

The information display unit 12 displays device information being managed by the device management apparatus 100. As described above, the information display unit 12 sends an information acquisition request including the identifier of a managed device 200 used as a search key to the information management unit 11 to obtain device information of the managed device 200. Also, the information display unit 12 provides a graphical user interface (GUI) for receiving an information acquisition request including the identifier of the managed device 200 from the user.

Thus, the device management apparatus 100 is capable of providing device information of the managed device 200 to the user.

The information acquisition unit 13 obtains device information from the managed device(s) 200 being managed by the device management apparatus 100. The information acquisition unit 13 sends an information acquisition request via a communication protocol to the managed device 200. In response, the managed device 200 returns its device information to the device management apparatus 100. For example, when SNMP is used as the communication protocol, the device management apparatus 100 and the managed device 200 communicate with each other as described below. The device management apparatus 100 sends a Get command to the managed device 200 to request device information. In response, the managed device 200 returns the device information using a GetResponse command to the device management apparatus 100. The information acquisition unit 13 periodically sends information acquisition requests to the managed device(s) 200.

[Managed Device]

The communication protocol information management unit (first information source) 21 manages device information that is provided (or available) via communication protocols supported by the managed device 200 (communication protocols usable for communications with the device management apparatus 100). As described above, the managed device 200 supports multiple communication protocols such as SNMP and SOAP. The communication protocol information management unit 21 manages device information for the respective communication protocols and includes information resources (information management units) corresponding to the communication protocols.

In the example shown in FIG. 4, the communication protocol information management unit 21 includes an SNMP information management unit $21_1$, a SOAP information management unit $21_2$, and an FTP information management unit $21_n$. For example, the SNMP information management unit $21_1$ manages a management information base (MIB) provided via SNMP.

The communication protocol information management unit 21 registers, deletes, searches, and obtains communication protocol information according to requests from the information providing unit 23. When receiving an information acquisition request (requesting device information associated with the communication protocol information management unit 21) from the information providing unit 23, the communication protocol information management unit 21 searches for and obtains communication protocol information (requested device information) based on the information acquisition request, and returns the obtained communication protocol information to the information providing unit 23. Thus, the managed device 200 is capable of providing up-to-date device information (device information available via communication protocols) in response to a request.

The extended information management unit 22 is provided separately from the communication protocol information management unit 21. The extended information management unit (second information source) 22 manages device information (extended information or additional information) that is not provided (or available) via the communication protocols supported by the managed device 200.

For example, the extended information management unit 22 registers, deletes, searches, and obtains extended information according to requests from the information providing unit 23. The extended information management unit 22 receives extended information via a GUI and stores the received extended information in a predetermined storage area of the storage unit 212 of the managed device 200. Thus, the managed device 200 is capable of registering device information (extended information) that is not available via existing communication protocols. Similar to the communication protocol information management unit 21, the extended information management unit 22 obtains device information (extended information) in response to an information acquisition request from the information providing unit 23 and returns the obtained device information to the information providing unit 23. Thus, the managed device 200 is capable of providing up-to-date device information (extended information that is not available via communication protocols) in response to a request.

Figure 5A:
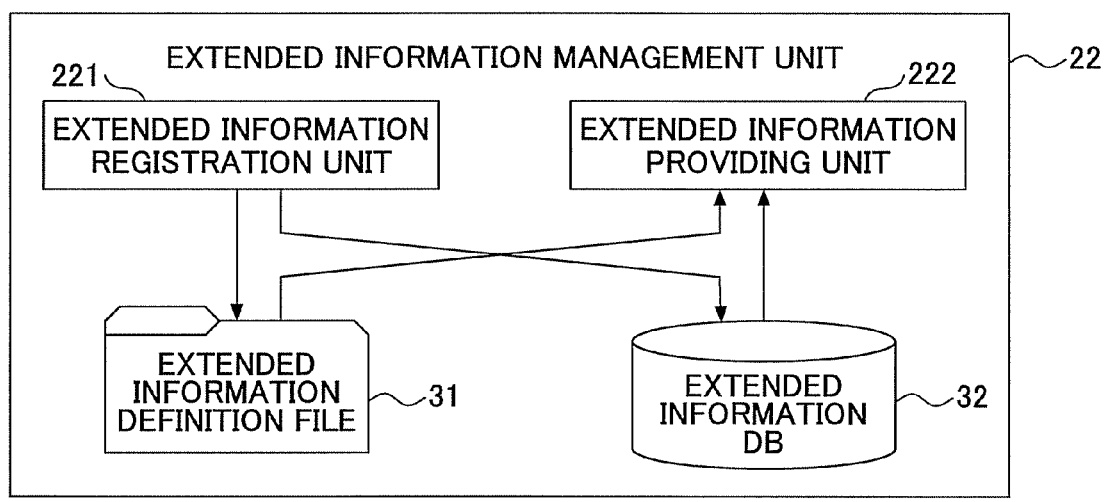
FIG. 5A is a drawing illustrating an exemplary functional configuration of an extended information management unit according to the first embodiment.
Figure 5B:
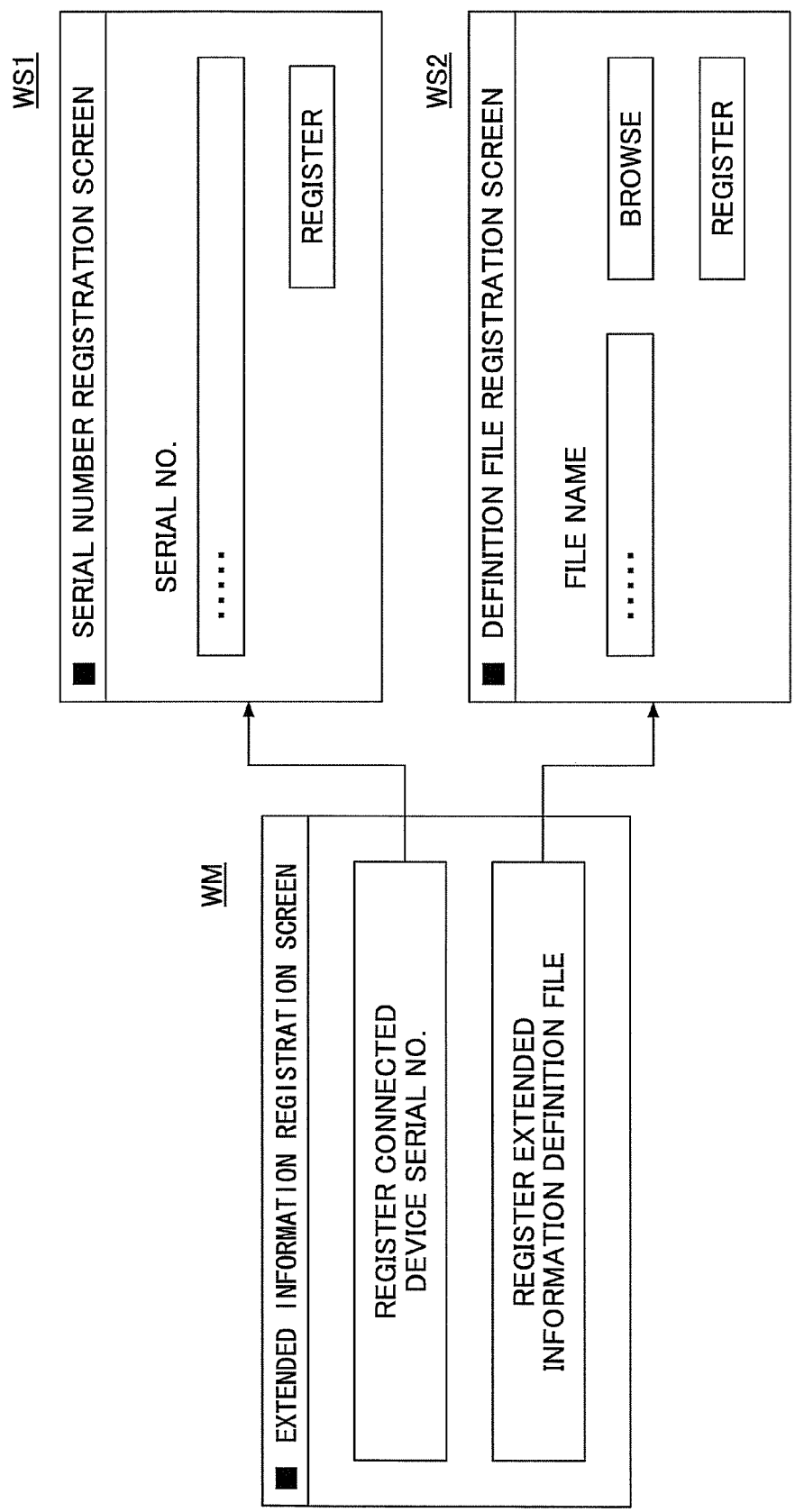
FIG. 5B is a drawing used to describe a process of registering extended information.

FIG. 5A is a drawing illustrating an exemplary functional configuration (functional units) of the extended information management unit 22 of this embodiment, and FIG. 5B is a drawing used to describe a process of registering extended information.

As illustrated in FIG. 5A, the extended information management unit 22 includes an extended information registration unit 221 and an extended information providing unit 222.

The extended information registration unit 221 registers device information (extended information) that is not available via existing communication protocols. The extended information registration unit 221 receives extended information via a GUI and stores the received extended information in a file format (extended information definition file 31) or a database format (extended, information database (DB) 32) in a predetermined storage area of the storage unit 212 of the managed device 200.

FIG. 5B is a drawing used to describe an exemplary process of registering extended information by the extended information registration unit 221. In this exemplary process, device information (extended information) regarding a finisher (connected device) connected to the image processing device (managed device) 200 is registered in a file format.

The extended information registration unit 221 displays an extended information registration screen WM as shown in FIG. 5B that is a GUI for registering extended information. When a "Register Connected Device Serial No." button on the extended information registration screen WM is pressed, the extended information registration unit 221 displays a serial number registration screen WS1 that is a GUI for inputting the serial number of a connected device. On the serial number registration screen WS1, the user inputs the serial number of the finisher (i.e., an identifier of a connected device) connected to the image processing device (managed device) 200 in a text box "Serial No." and presses a "Register" button to register the serial number of the finisher.

When a "Register Extended Information Definition File" button on the extended information registration screen WM is pressed, the extended information registration unit 221 displays a definition file registration screen WS2 that is a GUI for registering an extended information definition file. On the definition file registration screen WS2, the user inputs a file name of an extended information definition file defining device information (extended information) of the finisher in a text box "File Name" or selects the extended information definition file by pressing a "Browse" button, and presses a "Register" button to register the extended information definition file in association with the identifier (serial number) of the finisher. In the example shown in FIG. 5A, the extended information definition file 31 is registered in the extended information management unit 22.

Thus, the extended information registration unit 221 of the managed device 200 makes it possible to store device information (extended information), which is not available via communication protocols, in a given data format in a storage area.

In addition to an extended information definition file stored in the storage unit 212 of the managed device 200, an extended information definition file stored in the storage medium 214a connected via the external storage I/F 214 may be selected using the "Browse" button.

FIG. 6A is a drawing illustrating exemplary extended information 31D contained in the extended information definition file 31 of the finisher.

The extended information 31D is text data describing information on the finisher in a predetermined description format. The information on the finisher, for example, includes the maximum number of copies per month, supported paper sizes, and word lengths indicating power consumption levels in various power supply modes. Each information item in the extended information 31D is expressed by an information item name (a parameter name such as "MaxCopyCounterPerMonth") and a value (a parameter value such as "20000").

Extended information (device information that is not available via existing communication protocols) may be registered in a format other than a file format. For example, the extended information registration unit 221 may be configured to store extended information in a database format in a storage area.

FIG. 6B is a table showing exemplary extended information 32D of the extended information DB 32. The extended information DB 32 contains the extended information 320 in a table format based on a predetermined schema. The extended information 320 includes information on finishers.

The extended information management unit 22 manages the extended information definition file 31 and the extended information DB 32 in association with the identifier(s) of the connected device(s).

In the above example, a process of registering extended information in a file format (the extended information definition file 31) is described with reference to FIG. 5B. When extended information is to be registered in a database format (the extended information DB 32), the extended information registration unit 221 displays a GUI for entering information item names and values. Also, the extended information registration unit 221 may be configured to register extended information either in a file format or a database format according to a registration format setting specified by the user.

Referring back to FIG. 5A, the extended information providing unit 222 provides the extended information 31D (file format) and the extended information 32D (database format) registered in the extended information management unit 22. When receiving an information acquisition request (requesting device information associated with the extended information management unit 22) from the information providing unit 23, the extended information providing unit 222 searches the extended information definition file 31 or the extended information DB 32 based on the information acquisition request to obtain requested extended information, and returns the obtained extended information to the information providing unit 23. For example, the extended information providing unit 222 performs a process as described below to provide information on a finisher (connected device) connected to the image processing device (managed device) 200. The extended information providing unit 222 searches the extended information definition file 31 or the extended information DB 32 based on the identifier of the finisher in the information acquisition request. If extended information of the finisher is found, the extended information providing unit 222 obtains (or extracts) a requested device information item from the extended information based on the identifier (e.g., an information item name or an information ID) of the requested device information item specified in the information acquisition request. Then, the extended information providing unit 222 returns the obtained device information item to the information providing unit 23.

Referring back to FIG. 4, the information providing unit 23 provides device information obtained from the communication protocol information management unit 21 or the extended information management unit 22. Based on an information acquisition request from the device management apparatus 100, the information providing unit 23 selects one of information sources (in the communication protocol information management unit 21) corresponding to communication protocols or an information source (the extended information management unit 22) for providing device information (extended information) that is not available via the communication protocols, obtains up-to-date device information requested by the information acquisition request from the selected information source, and returns the obtained device information to the device management apparatus 100. Thus, the information providing unit 23 obtains up-to-date device information from the communication protocol information management unit 21 or the extended information management unit 22 based on the information acquisition request.

Figure 7A:
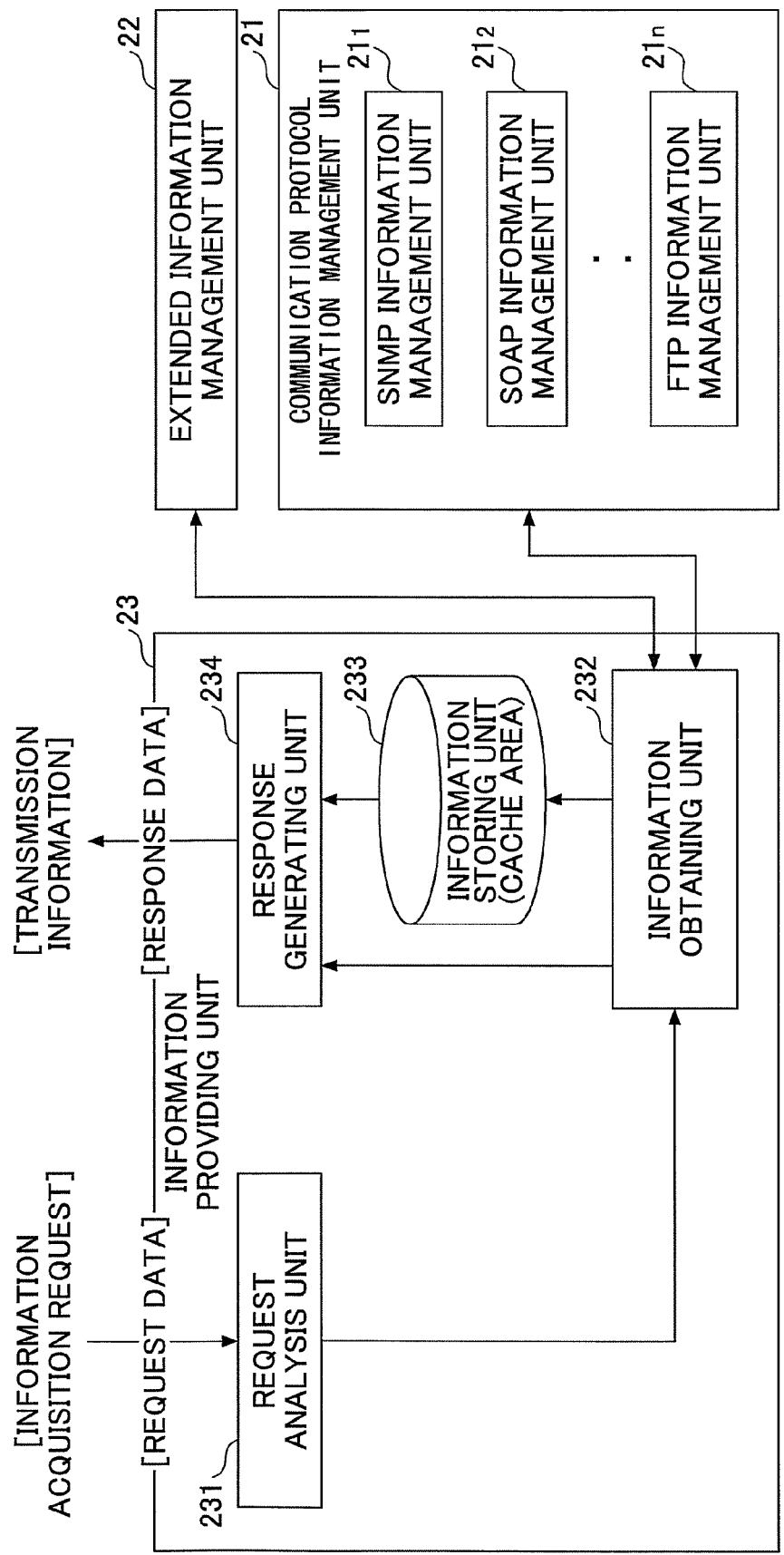
FIG. 7A is a block diagram illustrating an exemplary functional configuration of a managed device according to the first embodiment.

FIG. 7A is a block diagram illustrating an exemplary functional configuration of the managed device 200 of this embodiment, and FIG. 7B is a table showing exemplary stored data in the information providing unit 23.

As illustrated in FIG. 7A, the information providing unit 23 of the managed device 200 includes a request analysis unit 231, an information obtaining unit 232, an information storing unit (cache area) 233, and a response generating unit 234. These components may be called functional units.

The request analysis unit 231 receives an information acquisition request (request data) from the device management apparatus 100 and analyzes the received information acquisition request. The request analysis unit 231 may include a receiving unit and an analysis unit. For example, the request analysis unit 231 obtains, as analysis results, an IP address of the requester (i.e., the device management apparatus 100), a communication protocol (such as SNMP or SOAP) used to transmit the information acquisition request, and an identifier (e.g., an information item name or an information ID) of a requested device information item. With this configuration, the managed device 200 receives an information acquisition request from the device management apparatus 100 and analyzes the information acquisition request to determine the requested device information item.

The information obtaining unit 232 obtains up-to-date device information from the communication protocol information management unit 21 or the extended information management unit 22. The information obtaining unit 232 may include a determining unit and an obtaining unit. For example, the information obtaining unit 232 obtains device information from the communication protocol information management unit 21 or the extended information management unit 22 through a process as described below. Based on the identifier of the requested device information item (the result of analysis) from the request analysis unit 231, the information obtaining unit 232 determines whether an up-to-date version of the requested device information item is cached (or stored) in a predetermined storage area (i.e., the information storing unit 233) of the storage unit 212.

FIG. 7B is a table showing exemplary stored data (device information) 233D in the information storing unit 233 (the predetermined storage area). As shown in FIG. 7B, device information items that the managed device 200 can provide are temporarily stored (cached) in the information storing unit 233. The information storing unit 233 is, for example, a storage area (cache area) of a memory (e.g., RAM) of the managed device 200.

Each device information item in the stored data (cached data) 233D includes fields such as "updated date and time", "information item name", "value", and "information source (information management unit)". For example, a first device information item in FIG. 7B includes "updated date and time: 2009/11/05 17:53", "information item name: power consumption level in Full Power mode (word length)", "value: 704", and "information source: extended information management unit" that are associated with each other. With the stored data 233D as described above, the information obtaining unit 232 can search the information storing unit 233 for a requested device information item based on its identifier specified in the information acquisition request and thereby determine whether the requested device information item is cached (or present) in the information storing unit 233.

If the requested device information item is cached in the information storing unit 233, the information obtaining unit 232 refers to the updated date and time field of the cached device information item to determine whether the value of the cached device information item is up-to-date. For example, the information obtaining unit 232 obtains the current date and time, calculates duration between the updated date and time and the current date and time, and determines whether the calculated duration is greater than or equal to predetermined duration. If the calculated duration is greater than or equal to the predetermined duration, the information obtaining unit 232 determines that the up-to-date version of the requested device information item is not cached in the information storing unit 233.

Referring back to FIG. 7A, if the up-to-date version of the requested device information item is not cached, the information obtaining unit 232 obtains the up-to-date version of the requested device information item from an information source (one of the information management units in the communication protocol information management unit 21 or the extended information management unit 22) specified in the information source (information management unit) field of the cached device information item. Then, the information obtaining unit 232 caches the obtained up-to-date device information item in the information storing unit 233 and thereby updates the stored data 233D. Meanwhile, if the calculated duration is less than the predetermined duration, the information obtaining unit 232 determines that the up-to-date version of the requested device information item is cached in the information storing unit 233 and does not obtain the requested device information item from the communication protocol information management unit 21 and the extended information management unit 22.

In the above exemplary process, the information obtaining unit 232 updates the stored data 233D when an information acquisition request is received. Alternatively, the information obtaining unit 232 may be configured to periodically (regardless of whether an information acquisition request is received) check the updated date and time fields of device information items in the stored data 233D and maintain the stored data 233D up-to-date.

The response generating unit 234 transmits device information cached in the information storing unit 233 to the device management apparatus 100 in response to an information acquisition request. The response generating unit 234 may include a transmitting unit and a generating unit. After the information obtaining unit 232 updates the cached device information item or determines that the cached device information item is up-to-date as described above, the response generating unit 234 obtains the cached "up-to-date" device information item from the information storing unit 233 and generates transmission information according to the communication protocol obtained by the request analysis unit 231 from the information acquisition request. For example, when the information acquisition request is transmitted using the Get command of SNMP, the response generating unit 234 generates transmission information (response data that can be transmitted via SNMP) including the up-to-date device information item for the GetResponse command.

Thus, the managed device 200 can transmit up-to-date device information to the device management apparatus 100 in response to an information acquisition request.

As described above, the information providing function of this embodiment is provided by collaboration of the above functional units.

An information providing process (communications between functional units) for providing device information is described in more detail below.

The information providing function of this embodiment is implemented mainly by the CPU 211 of the managed device 200 and a program (a software component for implementing the information providing function) installed in the managed device 200. The CPU 211 loads the program from a storage area (e.g., ROM) into the RAM and executes the loaded program to perform an information providing process.

FIG. 8 is a flowchart showing an exemplary information providing process of this embodiment. In this exemplary process, it is assumed that the stored data 233D are updated when an information acquisition request(s) are received. Also in this exemplary process, it is assumed that the communication protocol information management unit 21 includes the SNMP information management unit $21_1$, the SOAP information management unit $21_2$, and the FTP information management unit $21_n$.

As shown in FIG. 8, the information providing unit 23 of the managed device 200 determines whether to terminate an information providing process for providing device information to the device management apparatus 100 (step S101). If it is determined to terminate the information providing process (YES in step S101), the information providing unit 23 terminates the information providing process. Meanwhile, if it is determined to not terminate (to continue) the information providing process (NO in step S101), the information providing unit 23 proceeds to the subsequent step. For example, the information providing unit 23 determines whether to terminate the information providing process based on a setting input via the operations panel 220 of the managed device 200.

Next, the information providing unit 23 waits for an information acquisition request from the device management apparatus 100 (NO in step S102).

When an information acquisition request (request data) is received from the device management apparatus 100 (YES in step S102), the request analysis unit 231 of the information providing unit 23 analyzes the received information acquisition request (step S103). For example, the request analysis unit 231 obtains the IP address of the requester (i.e., the device management apparatus 100), the communication protocol used to transmit the information acquisition request, and the identifier of a requested device information item as analysis results. The request analysis unit 231 sends the obtained analysis results to the information obtaining unit 232.

Based on the identifier of the requested device information item, the information obtaining unit 232 determines whether an up-to-date version of the requested device information item is cached (or stored) in the information storing unit 233 (step S104).

If the up-to-date version of the requested device information item is cached in the information storing unit 233 (YES in step S104), the information obtaining unit 232 sends the determination result (indicating that the cached device information item is up-to-date) to the response generating unit 234 and thereby requests the response generating unit 234 to generate transmission information.

The response generating unit 234 obtains the up-to-date version of the requested device information item from the information storing unit 233 based on the identifier of the requested device information item (obtained by the request analysis unit 231) and generates transmission information (response data) including the up-to-date version of the requested device information item according to the communication protocol (obtained by the request analysis unit 231) (step S105).

Then, the information providing unit 23 transmits the transmission information generated by the response generating unit 234 to the device management apparatus 100 based on the IF address obtained by the request analysis unit 231. Through the above process, the information providing unit 23 of the managed device 200 provides up-to-date device information of the managed device 200 to the device management apparatus 100.

Meanwhile, if the up-to-date version of the requested device information item is not cached in the information storing unit 233 (NO in step S104), the information obtaining unit 232 identifies an information source from which the up-to-date version of the requested device information item is to be obtained (step S107). The information obtaining unit 232 refers to the information source (information management unit) field of the requested (cached) device information item in the stored data 233D and thereby identifies the information source (one of the information management units of the communication protocol information management unit 21 or the extended information management unit 22) of the requested device information item.

When the identified information source is the extended information management unit 22 (YES in step S107$_1$), the information obtaining unit 232 obtains (the up-to-date version of) the requested device information item from the extended information management unit 22 (step S108). More specifically, the information obtaining unit 232 sends an information acquisition request to the extended information providing unit 222 of the extended information management unit 22. When receiving the information acquisition request (requesting the device information item associated with the extended information management unit 22), the extended information providing unit 22 searches the extended information definition file 31 or the extended information DB 32 based on the information acquisition request to obtain the requested device information item, and returns the obtained device information item to the information obtaining unit 232.

When the identified information source is the SNMP information management unit 21$_1$ (NO in step S107$_1$ and YES in step S107$_2$), the information obtaining unit 232 obtains (the up-to-date version of) the requested device information item from the SNMP information management unit 21$_1$ (step S108). More specifically, the information obtaining unit 232 sends an information acquisition request to the SNMP information management unit 21$_1$ of the communication protocol information management unit 21. When receiving the information acquisition request (requesting the device information item associated with the SNMP information management unit 21$_1$), the SNMP information management unit 21$_1$ searches the MIB based on the information acquisition request to obtain the requested device information item, and returns the obtained device information item to the information obtaining unit 232.

When the identified information source is the SOAP information management unit 21$_2$ (NO in step S107$_2$ and YES in step S107$_3$), the information obtaining unit 232 obtains (the up-to-date version of) the requested device information item from the SOAP information management unit 21$_2$ (step S108).

When the identified information source is the FTP information management unit 21$_n$ (NO in step S107$_3$ and YES in step S107$_4$), the information obtaining unit 232 obtains (the up-to-date version of) the requested device information item from the FTP information management unit 21$_n$ (step S108). The processes performed by the information obtaining unit 232 to obtain the requested device information item from the SOAP information management unit 21$_2$ and the FTP information management unit 21$_n$ are similar to the process for obtaining the requested device information item from the SNMP information management unit 21$_1$, and therefore descriptions of those processes are omitted here.

After step S108, the information obtaining unit 232 caches the obtained up-to-date device information item in the information storing unit 233 and thereby updates the stored data 233D (step S109).

After step S109, transmission information (response data) including the up-to-date device information item is generated and the transmission information is transmitted from the information providing unit 23 to (the information acquisition unit 13 of) the device management apparatus 100.

Meanwhile, if the information source of the requested device information item is not identified in steps S107$_1$ through S107$_4$ (NO in step S107$_4$), the information obtaining unit 232 performs an error process (step S110). In the error process, the information obtaining unit 232 sends the identification result (indicating that the information source has not been identified) to the extended information management unit 22 to request the extended information management unit 22 to prompt the user to register the requested device information item as extended information. For example, when receiving the identification result, the extended information registration unit 221 of the extended information management unit 22 displays the extended information registration screen WM as shown in FIG. 5B that is a GUI for registering extended information.

In summary, in the device management system 1 of this embodiment, the managed device 200 provides information to the device management apparatus 100 through a process as described below. When an information acquisition request (request data) is received from the device management apparatus 100, the request analysis unit 231 of the information providing unit 23 of the managed device 200 analyzes the received information acquisition request. Based on the analysis result (the identifier of a requested device information item), the information obtaining unit 232 of the information providing unit 23 determines whether an up-to-date version of the requested device information item is cached (or stored) in the information storing unit 233. If the up-to-date version of the requested device information item is not cached, the information obtaining unit 232 obtains the requested device information item from one of the information management units 21$_1$ through 21$_n$ of the communication protocol information management unit 21 or the extended information management unit 22 that is the information source associated with the requested device information item, and caches the obtained up-to-date device information item in the information storing unit 233. Then, the response generating unit 234 of the information providing unit 23 returns the cached device information item to the device management apparatus 100. In other words, the managed device 200 includes, in addition to information sources corresponding to existing communication protocols, a separate information source for providing device information that is not available via the existing communication protocols, and obtains requested device information from a corresponding information source according to an information acquisition request from the device management apparatus 100.

This configuration makes it possible to provide additional (extended) device information without extending the range of device information provided via existing communication protocols. That is, this configuration makes it possible to obtain additional device information that is not available via existing communication protocols.

Second and Third Embodiments

Functional configurations of the device management system 1 according to second and third embodiments of the present invention are described below.

Figure 9:
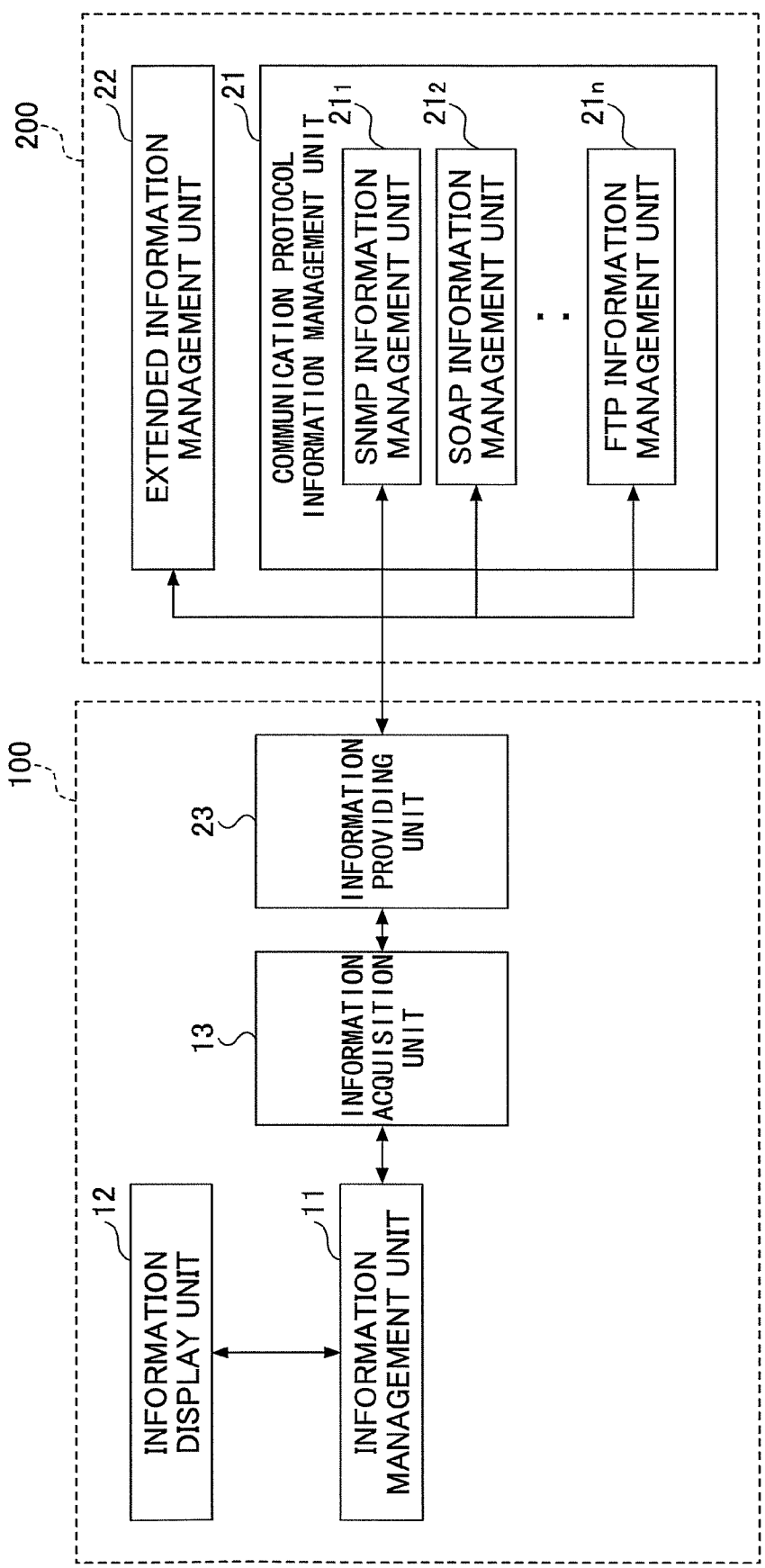
FIG. 9 is a block diagram illustrating an exemplary functional configuration of a device management system according to a second embodiment of the present invention.
Figure 10:
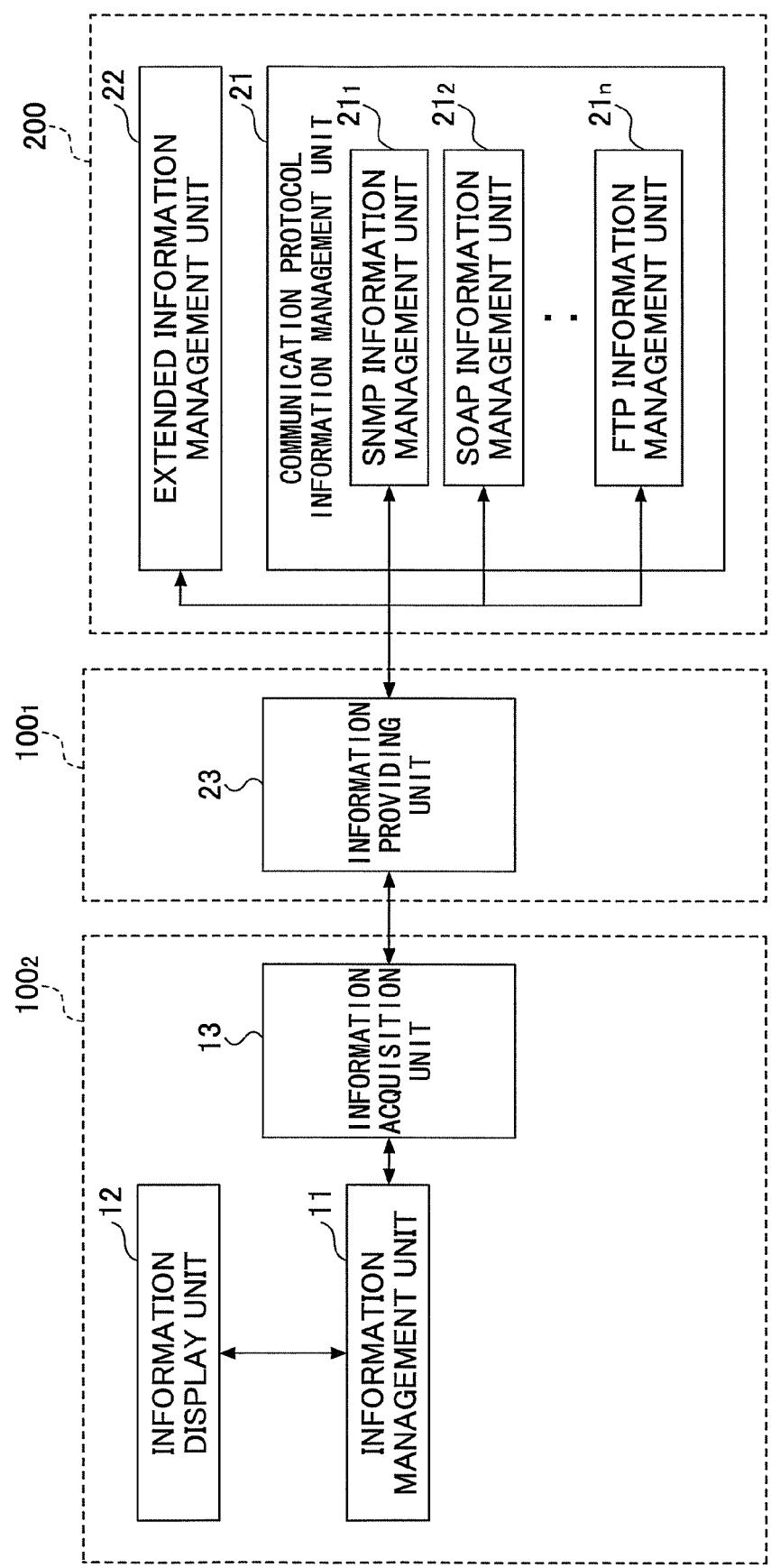
FIG. 10 is a block diagram illustrating an exemplary functional configuration of a device management system according to a third embodiment of the present invention.

FIG. 9 illustrates a functional configuration of the device management system 1 according to the second embodiment, and FIG. 10 illustrates a functional configuration of the device management system 1 according to the third embodiment.

The functional configurations of FIGS. 9 and 10 are different from the functional configuration of FIG. 4 in that the information providing unit 23 is provided outside of the managed device 200.

In the functional configuration of FIG. 9, the information providing unit 23 is provided in the device management apparatus 100. In this case, the information providing unit 23 obtains device information from the communication protocol information management unit 21 or the extended information management unit 22 via the data communication channel N, and provides the obtained device information to the information obtaining unit 13.

In the functional configuration of FIG. 10, the device management system 1 includes a device management apparatus $100_1$ and a device management apparatus $100_2$, and the device management apparatus $100_1$ includes the information providing unit 23. The device management apparatus $100_1$ may be implemented by any apparatus (e.g., a router) including a communication function. In this case, the information providing unit 23 obtains device information from the managed device 200 and provides the obtained device information to the information acquisition unit 13 of the device management apparatus $100_2$.

The functional configurations of FIGS. 9 and 10 make it possible to simplify the configuration of the managed device 200 and control the information providing process by the device management apparatus 100 ($100_1$, $100_2$), and thereby makes it easier to maintain the device management system 1 (e.g., eliminates the need to update software implementing the information providing unit 23 for each one of the managed devices 200).

The information providing function of the above embodiments is implemented mainly by executing a program written in a programming language supported by the operating environment (platform) of the managed device 200 using the control unit (e.g., the CPU 211) of the managed device 200.

The program may be stored in a non-transient computer readable storage medium (e.g., the storage medium 214a) such as an SD memory card or a USB memory.

The program stored in the storage medium may be installed, for example, via the external storage I/F 214 into the managed device 200. Alternatively, the program may be installed via a telecommunication line and the network I/F 213 into the managed device 200.

As described above, an aspect of this disclosure provides a device management system, a managed device, an information providing method, and a storage medium storing an information providing program that make it possible to obtain device information that is not available via existing communication protocols.

The present invention is not limited to the specifically disclosed embodiments, and variations and modifications may be made without departing from the scope of the present invention.

The present application is based on Japanese Priority Application No. 2010-040842, filed on Feb. 25, 2010, the entire contents of which are hereby incorporated herein by reference.

What is claimed is:
1. A device management system, comprising:
a managed device; and
a device management apparatus connected to the managed device via a data communication channel and managing the managed device,
wherein the device management apparatus includes an information acquisition unit transmitting an information acquisition request to request device information from the managed device;
wherein the managed device includes
a storage unit,
a first information source managing device information that is available via a communication protocol,
a second information source managing device information that is not available via the communication protocol, and
an information providing unit providing the requested device information to the information acquisition unit in response to the information acquisition request and including
a receiving unit receiving the information acquisition request from the information acquisition unit,
a determining unit determining whether an up-to-date version of the requested device information is stored in a storage area of the storage unit,
an obtaining unit obtaining the up-to-date version of the requested device information from the first information source or the second information source if the determining unit determines that the up-to-date version of the requested device information is not stored in the storage area of the storage unit, and
a transmitting unit transmitting the up-to-date version of the requested device information to the information acquisition unit of the device management apparatus.

2. The device management system as claimed in claim 1, wherein
the information providing unit further includes an analysis unit analyzing the information acquisition request received by the receiving unit; and
the determining unit searches for the requested device information based on an identifier of the requested device information that is obtained by the analysis unit from the information acquisition request to determine whether the up-to-date version of the requested device information is stored in the storage area of the storage unit.

3. The device management system as claimed in claim 2, wherein the determining unit obtains updated date and time of the requested device information stored in the storage area of the storage unit based on the identifier of the requested device information, calculates duration between the updated date and time and current date and time, and determines whether the up-to-date version of the requested device information is stored in the storage area of the storage unit by comparing the calculated duration with predetermined duration.

4. The device management system as claimed in claim 2, wherein the obtaining unit obtains information indicating an information source of the requested device information stored in the storage area of the storage unit based on the identifier of the requested device information, and obtains the up-to-date version of the requested device information from the first information source or the second information source based on the obtained information indicating the information source.

5. The device management system as claimed in claim 2, wherein the second information source includes a providing unit providing the up-to-date version of the requested device information to the obtaining unit of the information providing unit; and the obtaining unit requests the providing unit to provide the up-to-date version of the requested device information based on the identifier of the requested device information.

6. The device management system as claimed in claim 1, wherein the second information source includes a registration unit registering the device information that is not available via the communication protocol; and the obtaining unit requests the registration unit to display a registration screen for registering the requested device information in the second information source if the requested device information is not available from the first information source and the second information source.

7. The device management system as claimed in claim 1, wherein the information providing unit further includes a generating unit generating response data including the up-to-date version of the requested device information; and the transmitting unit transmits the response data generated by the generating unit to the information acquisition unit of the device management apparatus.

8. The device management system as claimed in claim 7, wherein the information providing unit further includes an analysis unit analyzing the information acquisition request received by the receiving unit and obtaining a communication protocol used to transmit the information acquisition request; and the generating unit generates the response data according to the communication protocol used to transmit the information acquisition request.

* * * * *